(12) United States Patent
Choi et al.

(10) Patent No.: US 10,077,487 B2
(45) Date of Patent: Sep. 18, 2018

(54) METHOD FOR ARSENIC OXIDATION AND REMOVAL FROM PROCESS AND WASTE SOLUTIONS

(71) Applicant: Barrick Gold Corporation, Toronto (CA)

(72) Inventors: Yeonuk Choi, Toronto (CA); Ahmad Ghahremaninezhad Gharelar, Kingston (CA); Noelene Ahern, Port Moody (CA)

(73) Assignee: Barrick Gold Corporation, Toronto (CA)

( * ) Notice: Subject to any disclaimer, the term of this patent is extended or adjusted under 35 U.S.C. 154(b) by 644 days.

(21) Appl. No.: 14/287,910

(22) Filed: May 27, 2014

(65) Prior Publication Data

US 2014/0356261 A1  Dec. 4, 2014

Related U.S. Application Data (60) Provisional application No. 61/828,560, filed on May 29, 2013.

(51) Int. Cl.
*C22B 30/04* (2006.01)
*C01G 49/00* (2006.01)
(Continued)

(52) U.S. Cl.
CPC .......... *C22B 30/04* (2013.01); *C01G 49/0018* (2013.01); *C22B 3/44* (2013.01); *C22B 30/02* (2013.01); *Y02P 10/234* (2015.11)

(58) Field of Classification Search
None
See application file for complete search history.

(56) References Cited

U.S. PATENT DOCUMENTS 4,786,323 A   11/1988  Gock et al.
7,429,551 B2 *  9/2008  Vo ........................ B01D 53/64
                                                           502/406

(Continued)

FOREIGN PATENT DOCUMENTS

CL          41167       7/2001
CL       2007-01225    11/2007
(Continued)

OTHER PUBLICATIONS

Feng et al. "The role of oxygen in thiosulphate leaching of gold." Hydrometallurgy, 2007, vol. 85(2-4), pp. 193-202.
(Continued)

*Primary Examiner* — Melissa S Swain
(74) *Attorney, Agent, or Firm* — Sheridan Ross P.C.

(57) ABSTRACT

The disclosure relates to the oxidation and immobilization of trivalent arsenic from arsenic-containing solutions. The process includes oxidation of trivalent arsenic ($As^{3+}$) species to the pentavalent state ($As^{5+}$). A carbon additive (e.g., activated carbon) and oxygen are used to promote the arsenic oxidation processes. After oxidation of arsenic to the pentavalent state, the arsenic can be removed by precipitation to ferric arsenate or calcium arsenate or other arsenic containing compounds known in the art. The oxidation of arsenic can also occur simultaneously with the production and precipitation of ferric arsenate (e.g., scorodite). Ferrous iron can be oxidized to ferric iron in the presence of activated carbon and oxygen.

24 Claims, 7 Drawing Sheets

(51) Int. Cl.
*C22B 30/02* (2006.01)
*C22B 3/44* (2006.01)

(56) References Cited

U.S. PATENT DOCUMENTS

| | | | | |
|---|---|---|---|---|
| 7,935,328 | B2 * | 5/2011 | Kimura | C01G 28/02 423/594.1 |
| 8,277,633 | B2 | 10/2012 | Kimura et al. | |

FOREIGN PATENT DOCUMENTS

| | | | |
|---|---|---|---|
| CL | 50423 | | 11/2014 |
| GB | 445468 | * | 4/1936 |
| JP | 2000219920 A | * | 8/2000 |
| JP | 2004091276 A | * | 3/2004 |
| JP | 2010043359 A | * | 2/2010 |
| JP | 2010089976 A | * | 4/2010 |
| JP | 2010285322 A | * | 12/2010 |
| JP | 2011177651 A | * | 9/2011 |
| KZ | 20626 | | 1/2009 |
| KZ | 25757 | | 5/2012 |
| RU | 2482074 | | 5/2013 |
| WO | WO 2004/059018 | | 7/2004 |
| WO | WO 2012/120197 | | 9/2012 |
| WO | WO 2013/173914 | | 11/2013 |

OTHER PUBLICATIONS

Huang et al. "Treatment of Arsenic(V)—Containing Water by the Activated Carbon Process." Journal (Water Pollution Control Federation), Mar. 1984, vol. 56, No. 3, pp. 233-242.

Riveros et al., "Arsenic disposal practices in the metllurgical industry," Canadian Metallurgical Quarterly, 2001, vol. 40(4), pp. 395-420.

International Search Report and Written Opinion for International (PCT) Patent Application No. PCT/IB2014/001398, dated Oct. 14, 2014 9 pages.

International Preliminary Report on Patentability for International (PCT) Patent Application No. PCT/182014/001398, dated Dec. 10, 2015, 7 pages.

Official Action for Canadian Patent Application No. 2,912,132, dated Nov. 1, 2016, 6 pages.

Official Action for Canadian Patent Application No. 2,912,132, dated Jun. 13, 2017, 4 pages.

Extended European Search Report for European Patent Application No. 14804682.4, dated Jan. 24, 2017, 8 pages.

Official Action (with English translation) for Kazakhstan Patent Application No. 2015/1453.1, dated Feb. 21, 2017, 4 pages.

Office Action (with English translation) for Kazakhstan Patent Application No. 2015/1453.1, dated Nov. 13, 2017, 4 pages.

Office Action (with English translation) for Kazakhstan Patent Application No. 2015/1453.1, dated Jan. 18, 2018, 4 pages.

Official Action (no translation available) for Chilean Patent Application No. 201503432, dated Sep. 21, 2017, 8 pages.

Official Action for Australian Patent Application No. 2014272804, dated Mar. 9, 2018, 3 pages.

Office Action for European Patent Application No. 14804682.4, dated Feb. 2, 2018, 6 pages.

* cited by examiner

METHOD FOR ARSENIC OXIDATION AND REMOVAL FROM PROCESS AND WASTE SOLUTIONS

CROSS REFERENCE TO RELATED APPLICATION

The present application claims the benefits of U.S. Patent Application Ser. No. 61/828,560, filed May. 29, 2013, entitled "METHOD FOR ARSENIC OXIDATION AND REMOVAL FROM PROCESS AND WASTE SOLUTIONS", which is incorporated herein by this reference in its entirety.

FIELD

The disclosure relates generally to arsenic removal and particularly to carbon catalyzed arsenic removal from aqueous streams.

BACKGROUND

Arsenic (As) is a common element in many sulfide ores and concentrates and is consequently a significant waste product produced during the extraction of some metals (e.g. Au and Cu). Due to the toxicity of arsenic, its removal from process and waste streams and its stabilization prior to disposal are necessary. For nearly complete removal of waste arsenic species from metallurgical process streams, it is required that arsenic exist in the pentavalent state ($As^{5+}$).

A typical arsenic removal process from As-containing metallurgical streams involves oxidation of arsenic to the pentavalent state and reaction with ferric iron to precipitate crystalline or amorphous ferric arsenate. A common practice for removal of arsenic from metallurgical process streams comprises oxidizing the arsenic species to the pentavalent state in an oxygenated autoclave at above 90° C. and at a pH below 4, thereby converting the pentavalent arsenic species to stable ferric arsenate compounds. The capital expenditure ("CAPEX") and operating expenditure ("OPEX") associated with autoclave processes are relatively high.

Other methods include the stepwise scorodite precipitation and the bio-scorodite precipitation processes. Both of these processes occur at temperatures below 95° C. and at atmospheric pressure. Addition of scorodite seed material can improve the kinetics of precipitation reactions; however, these processes are feasible only when arsenic is in pentavalent state.

Oxidation of arsenic with oxygen under atmospheric conditions is a very slow reaction and the presence of a strong oxidant, such as hydrogen peroxide, ozone or mixture of $SO_2/O_2$ gas, is required. The cost associated with these oxidants renders these processes economically unattractive.

There is a need for an alternative atmospheric arsenic oxidation process to produce pentavalent arsenic.

SUMMARY

These and other needs are addressed by the various aspects, embodiments, and configurations of the present disclosure. The present disclosure is directed to the removal of arsenic contaminants, particularly trivalent arsenic, from process or waste streams.

An arsenic contaminant removal process can include the steps of:
(a) receiving a trivalent arsenic-containing solution stream, the solution stream optionally having a higher concentration of trivalent arsenic than pentavalent arsenic;
(b) contacting the received solution stream with carbon and oxygen at an acidic pH to oxidize most or all of the trivalent arsenic to the pentavalent state; and
(c) thereafter separating the carbon from the oxidized (or pentavalent) arsenic.

A particularly advantageous arsenic contaminant removal process can include the steps of:
(a) receiving a trivalent arsenic-containing solution stream;
(b) contacting the received solution stream with a carbon additive and oxygen at an acidic pH to oxidize most or all of the arsenic from the trivalent state to a pentavalent state;
(c) separating the carbon additive from the pentavalent arsenic-containing solution stream;
(d) after separation of the carbon additive from the pentavalent arsenic-containing solution stream, contacting the pentavalent arsenic-containing solution stream with a ferric ion-containing solution to precipitate the pentavalent arsenic as scorodite and form an arsenic depleted liquid phase; and
(e) separating the scorodite from the arsenic depleted liquid phase These processes oxidize trivalent arsenic with air or oxygen gas as oxidant. Activated carbon or other carbon-based materials are used to promote the oxidation reaction. Typical oxidation conditions are room temperature and acidic pH, and the oxidation process typically reaches completion in less than 24 hours.

The received solution stream typically contains negligible solids content, which is typically less than about 5 wt. % solids and more typically no more than about 1 wt. % solids. Additionally, the solution stream can have any level of ferrous and ferric iron.

In the carbon contacting step, the solution stream commonly has a pH of no more than about pH 2.5 and an oxidation-reduction potential of greater than about 350 mV (vs. Ag/AgCl reference electrode).

At the reaction conditions of the contacting step, most or all of the oxidized arsenic can adsorb onto the carbon. In that event, most or all of the arsenic-loaded carbon can be separated to form a treated solution stream. The treated stream will contain less total arsenic than the received solution stream.

Preferentially, the arsenic-containing received solution stream is moved through a series of tanks containing a sufficient amount of carbon to ensure that the treated solution stream, or discharge solution, contains pentavalent arsenic. The pentavalent arsenic of the discharge solution can be precipitated thereafter as scorodite.

Optionally an aqueous wash solution can remove most or all of the pentavalent arsenic from the loaded carbon to form an arsenic-depleted carbon and pentavalent arsenic-loaded wash solution. The loaded wash solution can be contacted with ferric ion to precipitate most or all of the dissolved pentavalent arsenic as the ferric compound, scorodite.

The pentavalent arsenic-loaded wash solution can be recycled to the pentavalent arsenic removal step prior to contacting the pentavalent arsenic-loaded wash solution with ferric ion. In this manner, a pentavalent arsenic concentration in the pentavalent arsenic-loaded wash solution is allowed to build up to a higher level enabling removal of more scorodite per unit of pentavalent arsenic when compared to the absence of recycling of the pentavalent arsenic-loaded wash solution to the removal step.

To eliminate the washing step, ferric ion can be introduced to the received solution stream during arsenic oxidation (in the presence of carbon) to precipitate the dissolved and oxidized arsenic as a ferric compound, such as ferric arsenate. Alternatively or additionally, ferrous iron can be introduced and readily be oxidized to ferric iron in the presence of carbon and oxygen/air.

The ferric ion can be introduced into the received solution stream by contacting a ferrous iron-containing material with the carbon and trivalent arsenic-containing solution stream.

Separation of carbon from the iron-containing material can be done by any technique, including using differences in particle size, surface properties, and/or density/specific gravity.

When scorodite precipitation is conducted simultaneously with arsenic oxidation, the separation of the carbon from the ferric arsenate precipitate can be done using carbon of an appropriate size recoverable by screening. Exemplary types of activated carbon that can be employed include granular activated carbon, extruded activated carbon, bead activated carbon, and other types of activated carbon.

The trivalent arsenic-containing solution stream can be derived from a hydrometallurgical leaching process, with the trivalent arsenic-containing solution being a byproduct of a valuable metal recovery process.

The present disclosure can provide a number of advantages depending on the particular configuration. This process can provide a highly effective and rapid process for removing trivalent arsenic from process and waste solution streams. The carbon-based additive is generally not consumed in the oxidation reaction and can be recycled to reduce operating expenses. Periodic acid wash of the carbon-based additive can reduce buildup of various impurities, including pentavalent arsenic, on the carbon surface, thereby further prolonging the useful life of the carbon additive. Inexpensive air or oxygen gas is typically the only consumed reagent. The oxidation reaction can be carried out under ambient conditions in less than 24 hours. Under some conditions, oxidation can reach completion in as little as 4 hours. This process could potentially be used to oxidize difficult-to-oxidize metalloid species, such as antimony. This process can be readily adapted to hydrometallurgical processes by treating valuable metal pregnant or barren liquid streams after removal of leach residue. In other conventional processes, scorodite is precipitated during leaching, thereby complicating recovery of valuable metals, such as copper, in the leach residue (which contain the scorodite) and/or increasing operating expenses due to the need to send a greater amount of solids to subsequent valuable metal recovery unit operations. Stated differently and compared to conventional processes, the process of this disclosure does not leach valuable metals from valuable metal-containing materials and form scorodite simultaneously.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "activated carbon" is a form of carbon processed to contain numerous small, low-volume pores that increase the surface area available for adsorption or chemical reactions. Activated carbon can be granular, extruded, bead, impregnated, and/or polymer coated. AF5™, which is an activated carbon derived from calcined resin, can also be employed.

The term "carbon" includes a carbon-containing organic material, such as one or more of activated carbon (or activated charcoal or activated coal), coal (e.g., peat, lignite, sub-bituminous coal, bituminous coal, steam coal, anthracite, and graphite), brown coal, coke, hard carbon derived from coconut sheels or elemental carbon, and mixtures thereof.

The term "means" shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Overview

This disclosure describes a process to oxidize trivalent arsenic to pentavalent arsenic, thereby rendering the arsenic amenable to precipitation to stable arsenic compounds, such as scorodite, and allowing the oxidized arsenic to be removed from process or waste solution streams for disposal in an environmentally acceptable manner.

The aqueous arsenic bearing process or waste solution stream can be from a variety of processes. The process or waste solution stream can be from any source, such as industrial, mining (e.g., a solution stream from a hydrometallurgical metal recovery process such as an atmospheric or superatmospheric leaching operation), mine run off, and the like.

Regardless of the process that produces the process or waste solution stream, the solution stream commonly contains trivalent and, possibly, pentavalent arsenic. In a typical process or waste solution stream, most of the arsenic present in the solution stream is in the form of trivalent arsenic rather than pentavalent arsenic. As will be appreciated, this process can also treat successfully process or waste solution streams in which the concentration of trivalent arsenic is less than that of pentavalent arsenic.

The process involves mixing the trivalent arsenic-containing process or waste solution stream with a carbon additive, which is commonly activated carbon, to oxidize most, or all, of the trivalent arsenic to pentavalent arsenic. While not wishing to be bound by any theory, it is believed that the carbon additive acts as a catalyst in arsenic oxidation and/or a collection surface of pentavalent arsenic depending on reaction conditions. Both mechanisms can occur in which case the carbon additive surface will adsorb some pentavalent arsenic and also catalyze oxidation of trivalent arsenic to dissolved pentavalent arsenic. The process or waste solution stream should be acidified to a pH commonly of no more than about pH 2.5, more commonly no more than about pH 2, and even more commonly no more than about pH 1.5 (with a pH of about pH 1 being typical) and treated with oxygen-containing gas (e.g., air, molecular oxygen-enriched air or molecular oxygen gas) at atmospheric pressure and temperature. Increasing the temperature or pressure of the process can increase the kinetics of the oxidation process. Depending on the arsenic concentration of the solution stream and the oxidation conditions employed, a relatively high volume of carbon additive may be required in the trivalent arsenic oxidation stage to ensure fast kinetics of the reaction. For instance, oxidation of trivalent arsenic in a one liter process solution stream with 10 g/L trivalent arsenic concentration would commonly require greater than 100 g activated carbon (preferably 300 g activated carbon per liter of solution stream 100). Oxygen gas should be supplied during the oxidation process to keep the dissolved oxygen concentration in the solution stream 100 in the level of a few ppm. The oxidation-reduction potential ("ORP") (Ag—AgCl electrode) is commonly observed to be greater than about 350 mV and more commonly greater than about 400 mV.

The preferred method of arsenic oxidation is by a continuous operation. To operate continuously, the carbon additive can be retained in a first reactor, and the arsenic-bearing process or waste solution stream 100 pH, commonly adjusted to no more than about pH 1, is fed into one or more reactors and sparged or otherwise contacted with air/oxygen. Alternatively, the carbon additive and arsenic-bearing process or waste solution stream 100 can be moved co- or counter-currently through a series of reactors.

The presence of ferric ions is required for scorodite precipitation. The pentavalent arsenic-containing solution stream is reacted, or contacted, with a ferric-containing stream, typically at a pH of no more than about pH 4, temperature of 80° C. or higher, and atmospheric pressure for about 24 hours to precipitate most of the pentavalent arsenic to crystalline $FeAsO_4 \cdot 2H_2O$. Alternatively, the arsenic-bearing process or waste solution stream 100 is contacted with ferrous ion before or during the oxidation stage, though this can cause scorodite to form during arsenic oxidation which can foul or blind the carbon additive surface.

Process Embodiments

Continuous Process Embodiments

Figure 1:
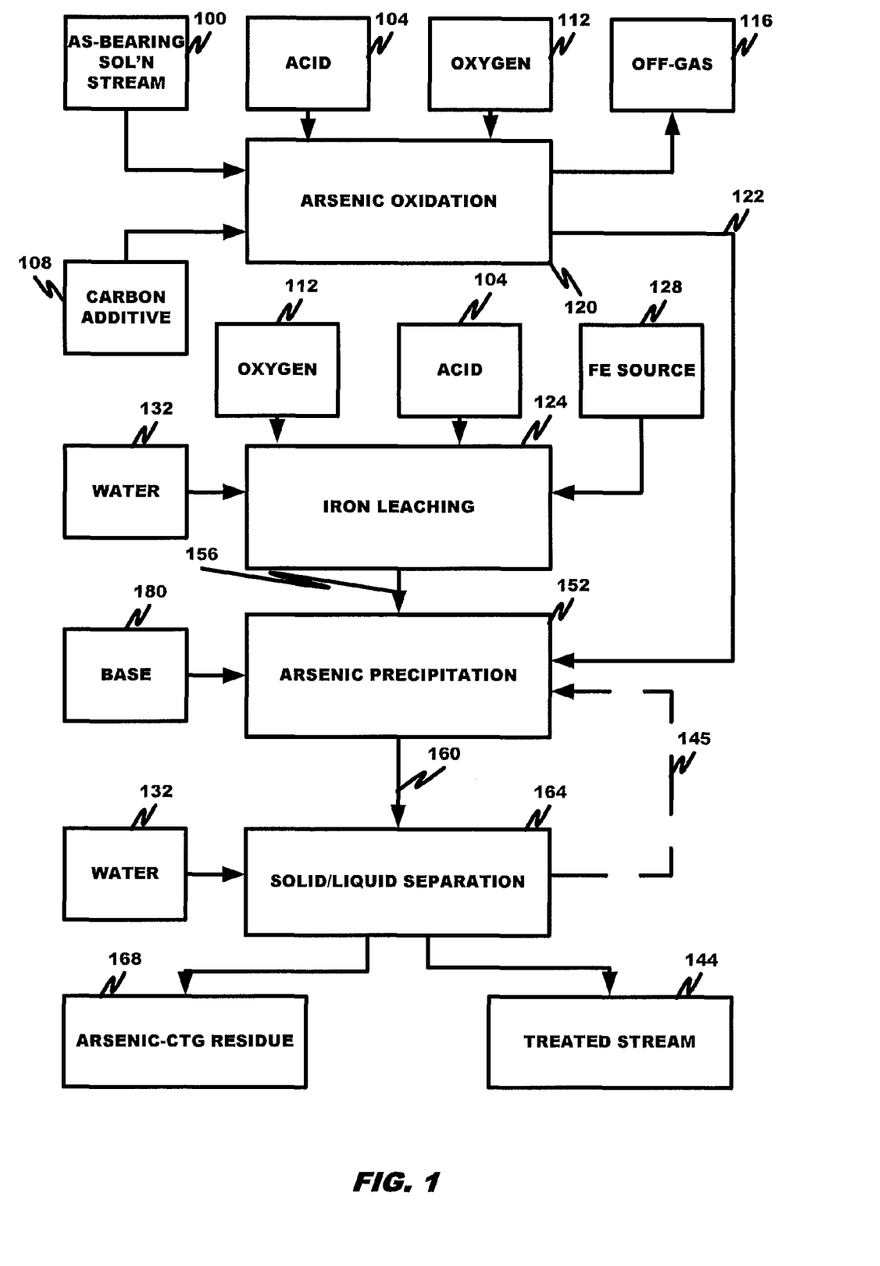
FIG. 1 is a process flow chart according to an embodiment.

Referring to FIG. 1, a continuous process for removing trivalent arsenic from an arsenic-bearing solution stream 100 is depicted. As noted, the method of the present disclosure is suitable for arsenic oxidation and precipitation from acidic waste or metallurgical process solution streams containing trivalent arsenic. Impure acidic solution streams may further contain metal ions, such as copper, iron and cobalt. A typical example of such a solution stream is an arsenic-containing solution stream generated in a metallurgical process for recovering gold from gold-bearing sulfide ores by means of roasting or by the hydrometallurgical leaching of valuable metals from arsenic- and valuable metal-bearing materials (such as ores and concentrates). The method can efficiently remove arsenic from the process solution streams and precipitate the arsenic as an environmentally-approved or stable material for disposal (e.g. scorodite).

In the arsenic oxidation stage 120 the arsenic-bearing solution stream 100 and acid 104 (if necessary for pH adjustment) are contacted with fresh and/or recycled carbon additive 108 to oxidize most of the trivalent arsenic to pentavalent arsenic in a pentavalent arsenic-containing solution stream 122. Required oxygen 112 for the reaction can be achieved by the use of air, oxygen-enriched air or industrial-pure oxygen gas and the non-reacted portion of the gas may be vented out as off-gas 116. While arsenic oxidation can be carried out at any temperature and pressure, ambient temperature and pressure is commonly employed. Residence time of the slurry in the arsenic oxidation stage 120 can be varied between about 2 and 24 hours, depending on the trivalent arsenic concentration of arsenic-bearing solution stream 100, oxygen source, the carbon solid-to-liquid ratio in the reactor, and the extent of desired arsenic oxidation. Presence of some cationic species, such as cupric and/or ferric ion, can further increase the oxidation kinetics.

In an iron leaching stage 124, a ferric-containing solution 156 is obtained by bio-oxidation or chemical leaching of an iron source 128 (e.g., Fe-containing minerals or compounds such as goethite, pyrrhotite, pyrite, limonite, iron hydroxide, jarosite, iron scraps, or iron sulfate). Required acid 104, oxygen 112, and makeup water 132 (if necessary) may be added. Carbon additive (not shown) may be added to the leaching stage 124 to assist iron oxidation to ferric. In the absence of carbon, air or oxygen 112 can oxidize ferrous iron to ferric iron. The leaching stage 204 operating conditions are generally known to those of ordinary skill in the art.

The generated ferric-containing stream 156 and pentavalent arsenic-containing solution stream 122 are then fed to an arsenic precipitation stage 152, to react ferric ion with pentavalent arsenic under atmospheric pressure and an elevated temperature commonly at least about 80° C. and more commonly at least about 85 but commonly not more than about 95° C., and residence time commonly ranging from about 4 to 24 hours to form an arsenic precipitate-containing slurry 160. Addition of crystalline scorodite seed (from about 10 to about 50 g seed/L of stream 156 can significantly reduce the required residence time but is not essential. A base 180 can be added, as needed, to adjust the pH of the combined streams for scorodite formation. Typically, the pH for scorodite formation ranges from about pH 0.5 to about pH 2.

Afterwards, the arsenic precipitate-containing slurry 160 is advanced to a solid/liquid separation stage 164 to separate an arsenic-depleted treated stream 144 from an arsenic-containing residue 168. Solid/liquid separation may be effected by any suitable technique. In many applications, solid/liquid separation is performed by a thickener circuit. A suitable flocculant can be added to assist separation. The underflow of the solid/liquid separation unit contains the crystalline ferric arsenate precipitate (or other arsenate compounds) in the arsenic-containing residue 168 and may be filtered, washed and dried and disposed of All or part of the overflow of the solid/liquid separation stage, which contains very low arsenic concentration, can be recycled as water 132, as water for carbon additive washing (or regeneration) (not shown) and/or arsenic precipitation stage 145 and/or to a metallurgical leaching step (now shown). Any unrecycled overflow can be used in another stage of the process (e.g. a scrubbing stage for the off-gas 116), or bled out (this may require further arsenic removal—polishing—before bleed).

The treated stream 144 can have very low dissolved arsenic concentrations. Typical dissolved arsenic concentrations are no more than about 2 g/L, more typically no more than about 1 g/L, more typically no more than about 0.5 g/L, and even more typically no more than about 0.1 g/L.

Figure 2:
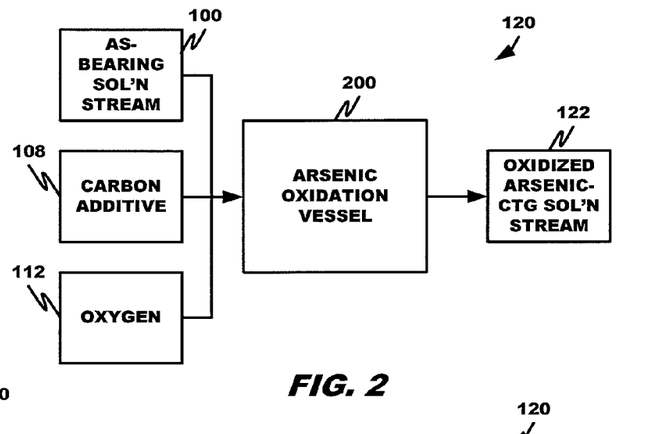
FIG. 2 is a process flow chart according to an embodiment.
Figure 3:
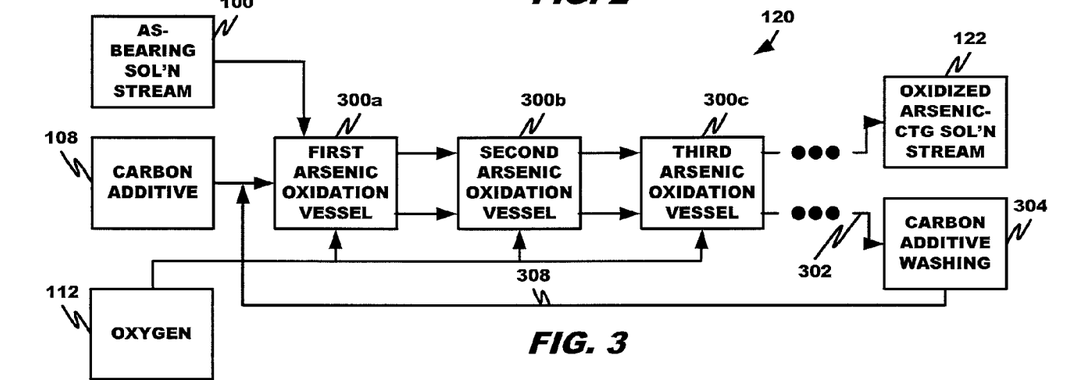
FIG. 3 is a process flow chart according to an embodiment.
Figure 4:
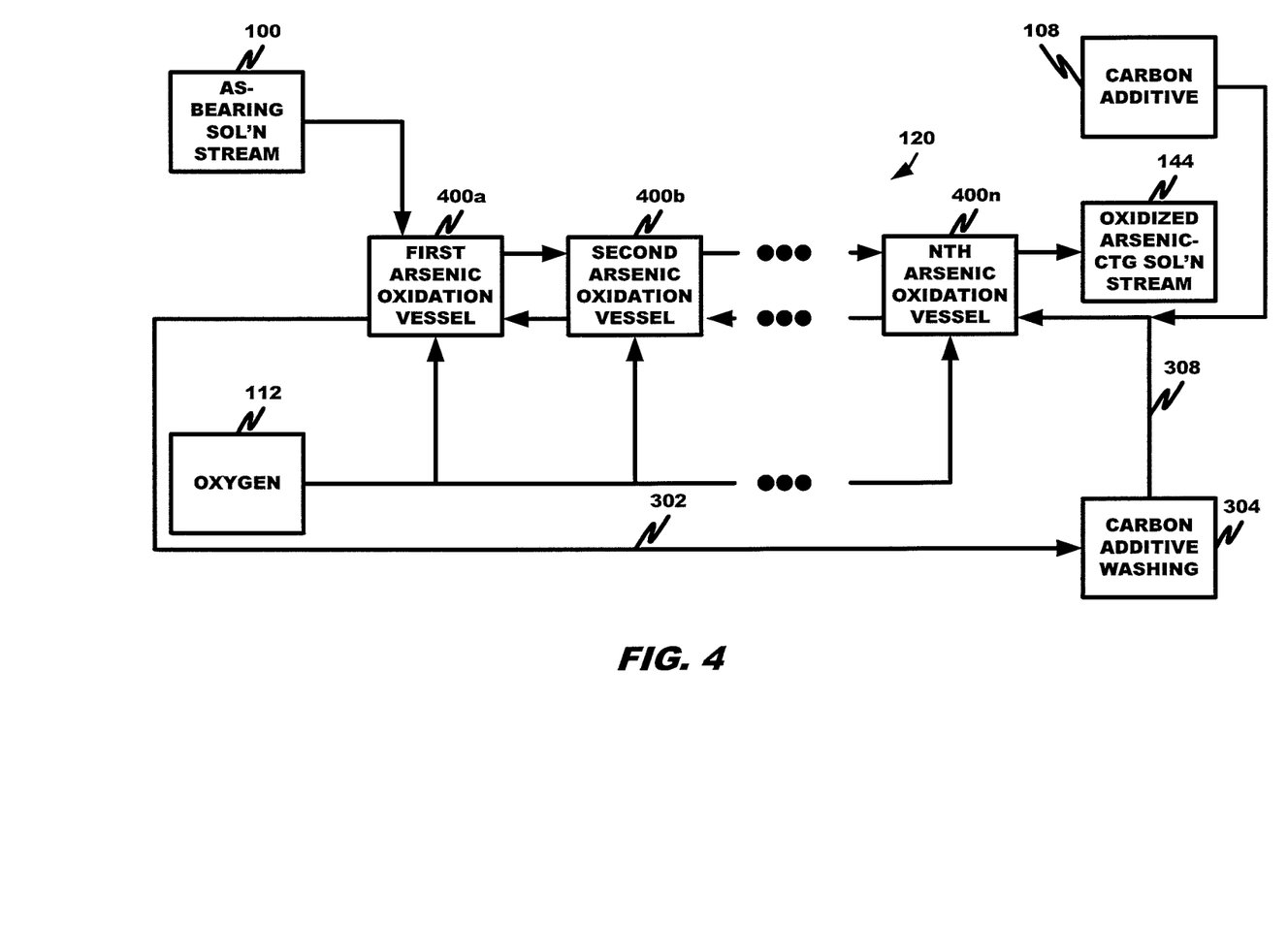
FIG. 4 is a process flow chart according to an embodiment.

Various process configurations for the arsenic oxidation stage 120 are shown in FIGS. 2-4.

Referring to FIG. 2, the arsenic-bearing solution stream 100, carbon additive 108, and oxygen 112 are contacted in one or more arsenic oxidation vessel(s) 200 to form the oxidized (or pentavalent) arsenic-containing solution stream 122. The carbon additive 108 can be contacted with and suspended in the solution stream 100 to form a slurry or supported by a porous and permeable surface, such as a screen, through which the solution 100 passes. In the former case, the oxidized arsenic-containing solution stream 122 is removed as the overflow from the reactor 200 while the carbon additive 108 remains in the reactor. In the latter case, the oxidized arsenic-containing solution stream 122 is removed from the fixed or fluidized bed of carbon additive 108; that is, the arsenic-bearing solution stream 100 can flow upward or downward through the bed of carbon additive 108, such as in a column.

Referring to FIG. 3, the arsenic-bearing solution stream 100, carbon additive 108, and oxygen 112 are contacted co-currently in multiple arsenic oxidation vessels 300a, b, c, . . . , which are sparged with air/oxygen, to form the oxidized (or pentavalent) arsenic-containing solution stream 122 as the overflow and a carbon additive 108 as the underflow. While three oxidation vessels 300a-c are shown, more or fewer vessels may be used depending on the application. The arsenic-bearing solution stream 100, acid 104 (if necessary for pH adjustment), and additional water (not shown) are mixed with the fresh and/or recycled carbon additive 108 to reach a proper slurry pulp density, typically from about 10 wt. % to about 45 wt. % and more typically from about 15 to about 35 wt. %, with about 25% of solids (i.e., carbon additive) (e.g., from about 100 to about 300 g/L carbon) being most typical. The slurry is mixed in a manner to keep the carbon additive suspended in the slurry, in an oxygenated condition, to oxidize most of the trivalent arsenic to pentavalent arsenic. The overflow and underflow from the first vessel 300a is fed into a second vessel 300b, from the second vessel 300b to the third vessel 300c, and so on to produce the oxidized arsenic-containing solution stream 122 and carbon additive 302.

Some pentavalent arsenic and contaminant metals can collect on the carbon additive surface. Recycled treated stream from stage 164 can be used to wash the used carbon additive, in the carbon additive washing stage 304, to remove at least some and typically most of the arsenic and collected metals from the carbon additive surface and regenerate the carbon additive surface. The washed carbon additive 308 is then recycled to the first arsenic oxidation vessel 300a where it can be contacted with fresh carbon additive 108.

Referring to FIG. 4, the arsenic-bearing solution stream 100, carbon additive 108 and recycled and washed carbon additive 308, and oxygen 112 are contacted counter-currently in multiple arsenic oxidation vessels 400a, b, . . ., n, which are sparged with air/oxygen, to form the oxidized (or pentavalent) arsenic-containing solution stream 122 as the overflow and a used carbon additive 302 as the underflow.

Additional reactors or tanks may be added to obtain the desired level of arsenic oxidation. The used carbon additive 302 is regenerated in the carbon additive washing step 304, and the regenerated carbon additive (along with fresh carbon additive as needed) 308 is introduced into the nth arsenic oxidation vessel 400n along with fresh carbon additive 108 while the arsenic bearing solution stream 100 is introduced into the first arsenic oxidation vessel 400a.

Batch Process Embodiments

Figure 5:
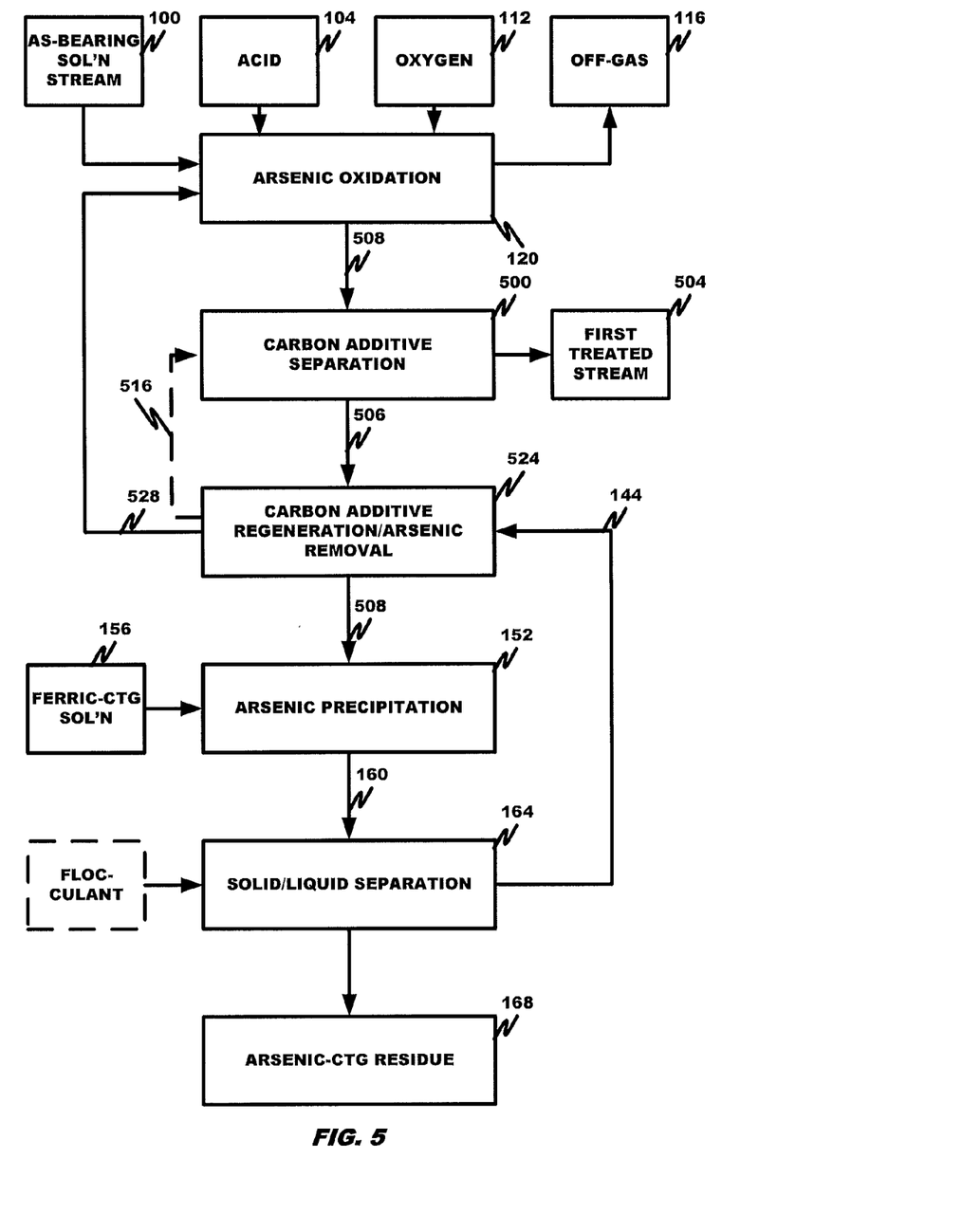
FIG. 5 is a process flow chart according to an embodiment.

Referring to FIG. 5, a batch process according to an embodiment is depicted. The process is similar to that of FIG. 1 with some notable differences. In the arsenic oxidation stage 120, the carbon additive is contacted with the arsenic-bearing solution stream 100 to form a slurry containing pentavalent arsenic-loaded carbon additive. During the oxidation process under ambient conditions, a majority of the formed pentavalent arsenic species is believed to adsorb on the surface of the carbon additive. After oxidation of most of the trivalent arsenic in the arsenic-bearing solution stream 100 to pentavalent arsenic species in the arsenic oxidation stage 120, the oxidized slurry 508 is fed to a carbon additive separation stage 500. Although any catalyst separation mechanism can be employed, such as screening, cyclone, decantation, and flotation, decantation by a settling tank. Through oxidation of trivalent arsenic to pentavalent arsenic, most of the oxidized arsenic species adsorb onto the carbon additive, thereby decreasing the total arsenic concentration in the liquid component of the slurry. The first treated stream 504, which can be the underflow from a screening operation, has a low As concentration (with most of any remaining arsenic being pentavalent) and can be recycled back to the another process stage (such as gas scrubbing of a roaster unit) and/or to a polishing stage where more pentavalent arsenic is extracted from the treated stream 504. Additional arsenic can be extracted by addition of fresh carbon additive 108 or by using a plurality of carbon additive containing tanks or columns (not shown). The treated stream can also be sent back to the used carbon additive regeneration and arsenic removal stage 524.

In the used carbon additive washing stage 524, the pentavalent arsenic-loaded carbon additive 506 is transferred to another vessel containing an aqueous wash stream where the pentavalent arsenic is stripped off the carbon additive and dissolved in a wash stream 508. The washing stage 524 is commonly performed in a column unit by displacement or decantation washing. In this unit, the loaded carbon additive is washed with an arsenic-free wash stream of recycled (second) treated stream 144 (or a stream with relatively low arsenic content such as the first treated stream 504) to form an arsenic-bearing wash stream 508. Arsenic removal from activated carbon normally requires elevated temperature (typically about 80° C. or higher, more typically about 85° C. or higher, and more typically between about 85 to about 95° C.), and the kinetics are fast (typical residence time is less than one hour). The washed or $As^{5+}$ depleted carbon additive 528 is returned to the oxidation stage 120. The residence time of the carbon additive in the washing step can be varied from several minutes to a few hours (preferably 1 hour or less), which depends on the temperature, volume and arsenic concentration of the first or second treated stream used for washing and concentration of loaded arsenic on the carbon additive in the separated and loaded carbon 506.

As will be appreciated, other washing techniques may be employed for carbon regeneration. For example, an agitated tank can be used to wash the carbon. Another washing method is a spray wash. Yet another washing method is spray washing on a carbon removal screen.

The washed carbon additive 528 is recycled back to the oxidation stage 120 for recycle and reuse.

The wash stream 508, which is loaded with arsenic species (mostly in the pentavalent state), then can be advanced to a crystalline ferric arsenate (scorodite, $FeAsO_4.2H_2O$ (which requires an Fe:As molar ratio of 1:1)) precipitation stage 152 or another arsenic stabilization process, where the wash stream 508 is contacted with the ferric-containing solution 156. The arsenic-bearing wash stream 508 commonly has from about 1 to about 25 g/L, more commonly from about 5 to about 15 g/L, and even more commonly about 10 g/L arsenic which is predominantly pentavalent. To form scorodite, the iron should be present as ferric ion (dissolved $Fe^{3+}$ species).

As shown by optional recycle loop 516, the arsenic-bearing wash stream 508 can be recycled to the carbon additive regeneration and arsenic removal stage 500 one or more times before pentavalent arsenic precipitation. Example 6 below shows that the wash stream 508 that washes the carbon can be recycled up to six times. This can beneficially build up the arsenic concentration in the wash stream 508 to a concentration below the saturation concentration prior to arsenic precipitation.

Addition of scorodite seed can significantly improve the kinetics of precipitate formation. The precipitate, or arsenic-containing residue 168, can then be separated from the second treated stream 144. The remaining second treated stream 144 can be recycled back to the arsenic-loaded carbon additive washing stage 524 and re-used, sent back to the off-gas scrubbing stage (not shown), or bled out (which may require an arsenic polishing step to remove any remaining arsenic before bleed of the treated stream).

An alternative to the above method for processing of the As-bearing solution stream 100, as presented in FIG. 5, is, in a common stage and reactor, to oxidize arsenic and iron-bearing material and precipitate crystalline ferric arsenate compound simultaneously. An example of this method is depicted in FIG. 6.

Figure 6:
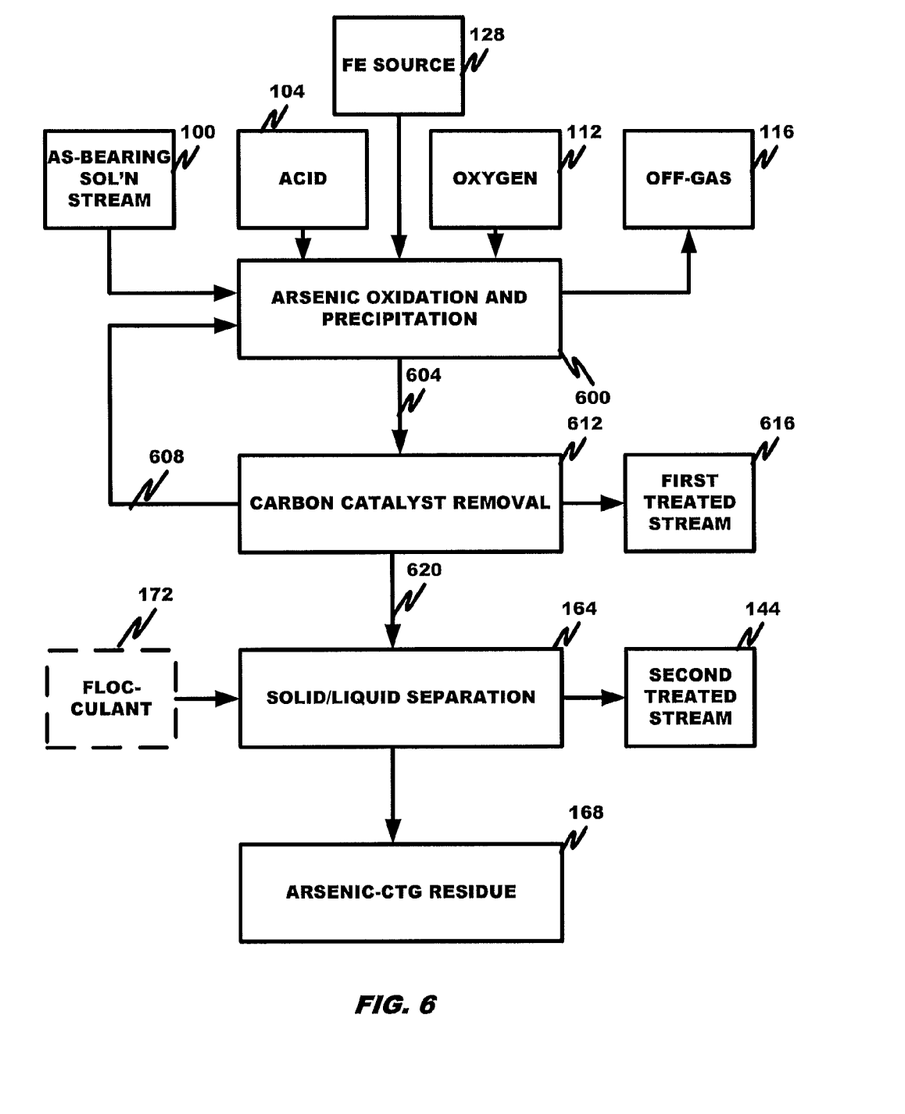
FIG. 6 is a process flow chart according to an embodiment.

In the process of FIG. 6, the arsenic oxidation and scorodite precipitation stages are carried out simultaneously in a single stage 600. Arsenic-bearing solution stream 100 is mixed with an iron source 128 (which, as discussed above, can be a mineral or compound such as goethite, pyrrhotite, pyrite, limonite or iron sulfate) in a stirred reactor in the arsenic oxidation and precipitation stage 600 to form a carbon and precipitate-containing slurry 604. Ferrous or ferric iron is leached from the mineral or compound. As will be appreciated, the ferrous or ferric iron can be leached separately from arsenic-bearing solution stream 100 by contacting the iron source 128 with an acidic leach solution, such as a portion of the first and/or second treated stream 616 or 144. The ferrous or ferric iron-containing leach solution can then be contacted with the arsenic-bearing solution stream 100 in stage 600. Alternatively, the iron source 128 can be leached, during step 600, in the presence of the arsenic-bearing solution stream 100. The primary difference between these two methods is that scorodite is mixed with the leach residue on disposal. The former approach may be desirable to isolate the arsenic in relatively high purity scorodite (e.g., with little or no leach residue present). Regardless of the approach employed, acid 104 may be added to the mixer unit, to adjust the pH of the slurry, preferably below about pH 3. Then, recycled carbon-based additive 608 is fed to mixer unit, where the slurry is mixed at elevated temperature (preferably ranging from about 80 to 95° C. and more preferably from about 85 to about 95° C.) and atmospheric pressure in an oxygenated condition to oxidize substantially all trivalent arsenic to pentavalent arsenic, dissolve iron as ferric ion, and simultaneously precipitate scorodite. Oxygen 112 can be supplied by the use of oxygen-enriched air or industrial-pure oxygen gas and the non-reacted portion of the gas may be vented out as off-gas 116. The residence time of the slurry in the mixer unit during the arsenic oxidation and precipitation stage 600 depends on the oxidation kinetics of Fe-containing minerals, trivalent arsenic concentration, temperature, concentration of dissolved oxygen gas, and kinetics of the desired ferric arsenate phase precipitation. Due to the high temperature applied in this alternative method and the presence of at least stoichiometric amounts of ferric iron, arsenic adsorption to the carbon additive is believed to be minimal, at best, and no washing step is commonly required.

In the carbon additive removal stage 612, the carbon additive is easily screened out of the carbon and precipitate-containing slurry 604 (due to the considerable size difference between the carbon additive and other solid phases in the slurry 604). Since the temperature of oxidation/precipitation processes in the arsenic oxidation and precipitation stage 600 is high (ranging from about 85 to about 95° C.), the concentration of the adsorbed arsenic on the carbon additive is commonly at a minimum, and the carbon additive 608 may directly be recycled back to the arsenic oxidation and precipitation stage 600, without requiring further washing or processing of the carbon additive.

The carbon additive-free slurry 620 advances to a solid/liquid separation stage 164 (such as a thickener operation). A flocculant 172 may be added directly to the slurry 620 or thickener (as shown), to improve the efficiency of the solid/liquid separation. Underflow of the thickener contains the arsenic-containing residue 168, which is largely crystalline ferric arsenate precipitate, and may be further washed and dried and safely disposed of The overflow or second treated stream 144, on the other hand, contains a very low arsenic concentration and can be processed for further arsenic removal (polishing) and bled or used in other process stages (e.g. scrubbing stage).

The methods of the present disclosure can allow for the efficient oxidation of trivalent arsenic ions from process solution streams or waste solution streams and their precipitation as a safely-disposable environmentally-friendly material (e.g., scorodite). The required oxidant in this process is oxygen gas. No other oxidants such as hydrogen peroxide or ozone are typically required. The carbon-based additive (e.g. activated carbon) is used to catalyze the oxidation reaction; however, the carbon additive itself commonly does not participate in the reaction. Attrition, due to mixing of the slurry, is the primary cause for additive wear and may be minimized by proper engineering of the reactors.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Example 1

Oxidation of Trivalent Arsenic Solutions

Seven different trivalent arsenic-containing solutions were treated with oxygen gas at 25° C. to determine the arsenic oxidation extent. Arsenic concentration in all solutions was the same (3.5 g/L $As^{3+}$), and pH of solutions was fixed at pH 1.0, 4.4, 6.0, 8.0, 10.0, 11.5, and 12.5, by addition of sulfuric acid (for solutions with acidic pH) or sodium hydroxide (for solutions with basic pH). No carbon catalyst was used in this series of tests. Arsenic oxidation tests were carried out for 6 hours with relatively moderate mixing of the solution (300 to 320 rpm), under atmospheric pressure, and oxygen gas was sparged into the solutions, with the flow rate of 1.0 L $O_2$/L solution/min. After 6 hours, trivalent arsenic was assayed by titration and total arsenic was assayed by Atomic Absorption Spectroscopy, giving pentavalent arsenic by difference. No pentavalent arsenic species were detected in any of solutions (detection limit is 0.05 g/L $As^{5+}$). The results show that oxygen gas, unaccompanied by a carbon catalyst, is not capable of oxidizing arsenic.

Example 2

Carbon Catalyzed Oxygenation of Trivalent Arsenic Solutions

Four different trivalent arsenic-containing solutions were treated with activated carbon at 40° C.
The composition of the solutions were:
Test A: 9.8 g/L $As^{3+}$,
Test B: 9.8 g/L $As^{3+}$ and 0.1 g/L $Cu^{2+}$,
Test C: 10.0 g/L $As^{3+}$ and 6.0 g/L $Fe^{3+}$,
Test D: 9.3 g/L $As^{3+}$, 3.0 g/L $Fe^{3+}$, 4.1 g/L $Fe^{2+}$, and 0.1 g/L $Cu^{2+}$.

The pH of all four solutions was adjusted to pH 1.0 to 1.1, using sulfuric acid. To each of the four solutions 330 g activated carbon/L of solution was added, yielding a catalyst pulp density of about 25%. The solution was mixed (300 to 320 rpm), for 24 hours under atmospheric pressure, and air (in the case of tests A and B) or oxygen gas (tests C and D) were sparged into the solutions, at a flow rate of 0.5 L gas/L slurry/min. After 24 hours, the trivalent arsenic was assayed by titration, and no trivalent arsenic species were detected in any of solutions (detection limit is 0.05 g/L $As^{3+}$). In addition, ferrous iron was oxidized to ferric. The results show that the trivalent arsenic species were oxidized effectively and that the presence of other metal ions did not interfere with the oxidation of arsenic. The results are summarized in Table 1 below.

TABLE 1

Activated carbon-assisted atmospheric oxidation of trivalent arsenic (and ferrous) in acidic solution, with a gas sparging rate of 0.5 L gas/L of slurry/min, at 40° C. for 24 hours

| | | Ferrous ($Fe^{2+}$) | | Ferric ($Fe^{3+}$) | Cupric ($Cu^{2+}$) | Arsenite ($As^{3+}$) | |
|---|---|---|---|---|---|---|---|
| Test | Gas | g/L added | Oxidation (%) | g/L added | g/L added | g/L added | Oxidation (%) |
| A | Air | 0.0 | — | 0.0 | 0.0 | 9.8 | >93% |
| B | Air | 0.0 | — | 0.0 | 0.1 | 9.8 | >93% |
| C | Oxygen | 0.0 | — | 6.0 | 0.0 | 10.0 | >93% |
| D | Oxygen | 4.1 | 100 | 3.0 | 0.1 | 9.3 | >93% |

Example 3

Arsenic Deportment

The arsenic content of the solution and carbon catalyst from Test A, of Example 2 were analyzed and the following distribution was observed.

|  | Total Arsenic | As³⁺ | As⁵⁺ |
| --- | --- | --- | --- |
| Arsenic Feed solution | 9.8 g | 9.8 g | ND |
| Treated Solution | 2.8 g | ND | 2.8 g |
| Loaded Carbon | 7.0 g |  |  |
| Carbon Wash Solution | 6.4 g | ND | 6.4 g |
| Washed Carbon | 0.6 g |  |  |

Of the 9.8 g trivalent arsenic added to the 1 L of feed solution, 2.8 g arsenic (28.5%) was left in solution (i.e. total arsenic) and the rest (7.0 g or 71.5%) was adsorbed to activated carbon. No detectable trivalent arsenic species remained in solution. Greater than 90% of the adsorbed arsenic (6.4 g out of 7.0 g) was stripped off the activated carbon via several stages of washing. No trivalent arsenic was detected in the wash solutions. Overall, out of 9.8 g trivalent arsenic, a minimum of 9.2 g is oxidized (~94%).

Example 4

Carbon Dose and Reaction Kinetics

Two solutions containing 9.4 g/L As$^{3+}$, and pH adjusted to pH 1.0 with sulfuric acid. The solutions were mixed for 24 hr at ambient temperature and pressure and an air flow rate of 0.5 L air/L of solution/minute. Two different pulp densities of carbon catalyst were employed:

Test E: 330 g activated carbon/L of solution,
Test F: 100 g activated carbon/L of solution.

After four hours, Test E (330 g C) exhibited 85% arsenic oxidation while in Test F (100 g C) the oxidation was only 53%. The results indicate that the higher the carbon dose, the faster the reaction kinetics. The results of the tests are shown in Table 2 below.

TABLE 2

Examples of kinetics of activated carbon-assisted atmospheric oxidation of trivalent arsenic in acidic solution, with aeration rate of 0.5 L air/L of slurry/min, at 20° C.

| Sampling time | Arsenic oxidation (%, ±1) | |
| --- | --- | --- |
| minute | Test E | Test F |
| 0 | 0 | 0 |
| 15 | 64 | 34 |
| 30 | 68 | 41 |
| 60 | 73 | 46 |
| 120 | 79 | 49 |
| 240 | 85 | 53 |
| 1440 | 95 | 66 |

Example 5

Stripping Arsenic from the Carbon Catalyst

A solution containing 9.8g/L As$^{3+}$ was pH adjusted to approximately pH 1 with sulfuric acid. And 330 g/L of activated carbon was added. Air was sparged into the mixture at a rate of 0.5 L gas/L slurry/min at 40° C. for 24 hours. This test yielded 165 g activated carbon catalyst containing 3.6 g adsorbed arsenic. The catalyst was mixed at 400 rpm for 24 hours in 2.1 L of DI water at 85° C. After the first hour of washing 80% of the arsenic was stripped off and over the course of 24 hours, 90% of the arsenic was removed from the catalyst. Arsenic concentration in the final wash water after 24 hrs was 1.54 g/L. Results of the test are provided herein below, in Table 3 below.

TABLE 3

Example of arsenic removal from 165 g activated carbon catalyst loaded with 3.6 g As, with DI water at 85° C., for 24 hrs.

| Sampling time hr | As stripped % |
| --- | --- |
| 0 | 0.0 |
| 1 | 79.5 |
| 2 | 81.8 |
| 4.5 | 87.3 |
| 24 | 89.8 |

Example 6

Recycling of Arsenic Containing Carbon Wash Solution

A simple carbon catalyst-washing process (is illustrated in Example 5). This example demonstrates the recycling of the wash solution in the carbon catalyst washing stage. Herein, through Example 6, it is shown that the same wash solution may be recycled and re-used for several hours until much higher arsenic concentrations can be obtained in the wash water. A solution containing 9.8 g/L As$^{3+}$ was pH adjusted to approximately pH 1 with sulfuric acid, and 330 g/L of activated carbon was added. Air was sparged into the mixture at a rate of 0.5 L gas/L slurry/min at 40° C. for 24 hours. This test yielded 6, 330 g batches of activated carbon catalyst each containing 7.0 g adsorbed arsenic. The first batch of catalyst was mixed at 400 rpm for 5 hrs in 2.0 L of DI water at 85° C. After five hours the carbon was removed from the water and a fresh batch of arsenic loaded carbon was added and the procedure was repeated until all six batches were washed in the same 2 L of water. Samples were taken after each batch of carbon had completed its wash cycle, and 1 hr washing solution samples were taken from selected washing stages 2, 3, 4 and 6.

Figure 7:
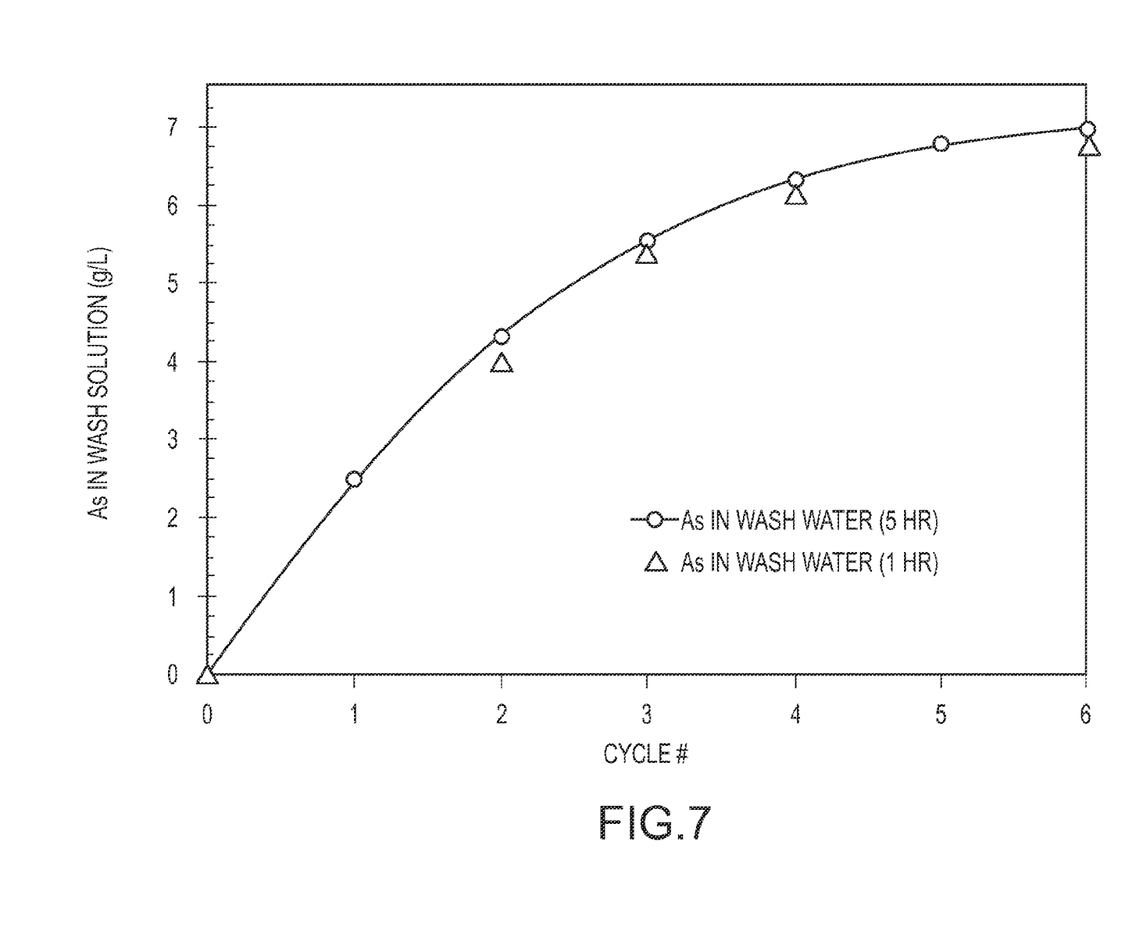
FIG. 7 is a plot of As concentration in wash solution (g/L) (vertical axis) against cycle number (horizontal axis)

FIG. 7 presents the arsenic concentration increase in the wash water, through the 6 batches of carbon washing. Based on the concentration of arsenic on activated carbon, and stripping duration and temperature, about 7 g/L (14 g total) arsenic is stripped off from the catalyst and dissolved in the wash solution. This concentration could be further increased by raising the stripping process temperature, duration and arsenic load on activated carbon. Furthermore, FIG. 7 indicates that the residence time of 1 hour or even less may be sufficient for catalyst washing. This result also indicates that several stages of washing would be required for more complete removal of arsenic from the wash solution, as 14 grams of arsenic were washed from carbon containing a total of 42 g of arsenic.

Example 7

Cycling of Washed Carbon Catalyst

This example shows that the activated carbon catalyst may be washed off after each oxidation batch and recycled back to the oxidation process. A solution containing 9.8 g/L Arsenic (As$^{3+}$) was pH adjusted to approximately pH 1 with sulfuric acid, and 330 g/L of activated carbon was added. Air was sparged into the mixture at a rate of 0.5 L gas/L slurry/min at 40° C. for 24 hours. This test yielded 330 g batches of activated carbon catalyst each containing 7.0 g adsorbed arsenic. The obtained oxidation extent was above 94%. Approximately 90% of arsenic adsorbed to the catalyst was washed off with 2 L water at 85° C. and the carbon catalyst was used in a second batch of arsenic oxidation, identical to the first batch. The arsenic oxidation extent was the same.

Example 8

Recycling of Partially Arsenic Loaded Carbon Catalyst

In another test, a 330 g batch of activated carbon catalyst each containing 7.0 g adsorbed arsenic was added to a solution containing 9.8 g/L Arsenic ($As^{3+}$) pH adjusted to approximately pH 1. Air was sparged into the mixture at a rate of 0.5 L gas/L slurry/min at 40° C. for 24 hours. The arsenic oxidation from solution was determined to be above 90%, meaning that the same carbon catalyst can be used for several hours or several batches of As oxidations process without washing, until the effectiveness of catalyst significantly decreases due to high $As^{5+}$ load.

Example 9

Simultaneous Arsenic Oxidation and Precipitation of Arsenic as Ferric Arsenate This example is intended to illustrate a simplified case of the process presented in FIG. 6. A trivalent arsenic and ferric-containing solution were treated with activated carbon at to determine the arsenic oxidation kinetics. A solution containing 8.7 g/L $As^{3+}$ and 46.0 g/L $Fe^{3+}$ (pH 1.0), was treated with 330 g activated carbon/L at 85° C. The resulting slurry was moderate mixed (300 to 320 rpm), for 24 hours under atmospheric pressure, while oxygen was sparged (0.5 L $O_2$/L slurry/min). Under the above conditions, only 20% of initial arsenic (1.7 g As) adsorbed to the carbon catalyst, which is significantly lower than that of Example 3. 99% of arsenic was oxidized during the initial four hours of the process. More than 31% of the oxidized arsenic precipitated as ferric arsenate. Under optimum conditions, more than 90% of As can be precipitated with ferric. The result of the test is shown in Table 4.

TABLE 4

Example of kinetics of activated carbon-assisted atmospheric oxidation of trivalent arsenic in a ferric containing acidic solution, with $O_2$ sparging rate of 0.5 L/L of slurry/min, at 85° C.

| Sampling time minute | Arsenic oxidation %, ±1 |
|---|---|
| 0 | 0 |
| 30 | 21 |
| 60 | 50 |
| 120 | 86 |
| 255 | 99 |
| 330 | 99 |
| 1440 | 99 |

Example 10

Continuous Test

A reactor containing 1 L of 10 g/L Arsenic ($As^{3+}$) was pH adjusted to pH 1 with sulfuric acid, and 1000 g of fresh wet activated carbon (500 g activated carbon and 500 g water) was added to yield an overall pulp density of 25%. The reactor was operated at room temperature and mixed at 400 rpm. Oxygen gas was sparged into the reactor at a rate of 1.5 L/min. A solution of 10 g/L Arsenic ($As^{3+}$) was fed into the reactor at a rate of 1 ml/min or 1.44 L/day, for a total residence time of 25 hours. The pH was maintained at pH 1 throughout the test. The overflow solution was collected and analyzed for trivalent arsenic.

Figure 8:
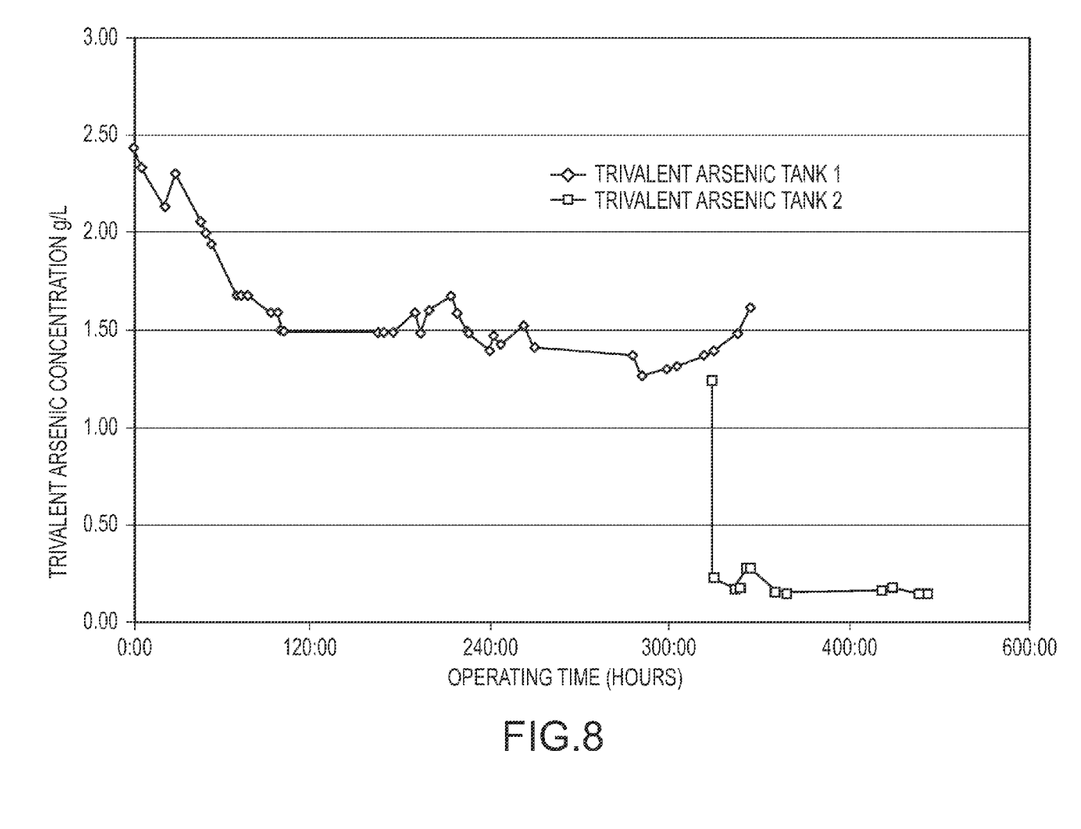
FIG. 8 is a plot of trivalent arsenic concentration (g/L) (vertical axis) against operating time (hours) (horizontal axis).

As shown in FIG. 8, the level of trivalent arsenic in the solution overflow ranged from approximately 2.5 g/L at the beginning of the test to approximately 1.5 g/L where it remained for approximately 10 days (240 hours). Therefore, once steady state was achieved, approximately 85% of the trivalent arsenic was oxidized to $As^{5+}$ from the feed solution. The ORP remained stable between 500 and 550 mV (Ag—AgCl) and the pH remained below pH 1 with little or no adjustment. After 388 hours of operation, the outlet flow from the reactor was fed into a second reactor tank containing 1000 g of fresh wet activated carbon, and which was operated in the same manner as the first tank. Once steady state was achieved, the trivalent arsenic content of the second tank was consistently below 0.3 g/L. This test indicates that the carbon can be employed for an extended period of time in a flow through system such as employed in this example, or alternatively in a column arrangement. This has the advantage that the catalyst only needs to be handled when it is washed, and wash solutions with high concentrations of Arsenic ($As^{5+}$) can be produced.

Example 11

Scorodite Formation

The outlet flow from Example 10 was contacted with $Fe_2(SO_4)_3$ as a ferric ion source to precipitate pentavalent arsenic as scorodite. Samples (Sco-A) of the mixture were taken at various time intervals at 0 hours, 2 hours, 5 hours, 24 hours, 29 hours, and 48 hours to determine dissolved arsenic and iron concentration. Scorodite samples were taken and washed, with samples of the wash solution being taken after each washing cycle to determine evolved levels of arsenic and iron. Table 5 shows the results:

TABLE 5

Scorodite Formation

| Solution | Time (hr) | As (mg/L) | Fe (mg/L) | Molar ratio Fe:As in soln | Molar ratio Fe:As in precipitate |
|---|---|---|---|---|---|
| Sco-A, 0 h | 0 | 10810 | 7960 | 0.99 | 0 |
| Sco-A, 2 h | 2 | 10490 | 7780 | 0.99 | 0.75 |
| Sco-A, 5 h | 5 | 8637 | 6390 | 0.99 | 0.97 |
| Sco-A, 24 h | 24 | 1785 | 1090 | 0.82 | 1.02 |
| Sco-A, 29 h | 29 | 784 | 337 | 0.58 | 1.02 |
| Sco-A, 48 h | 48 | 524.1 | 106 | 0.27 | 1.02 |
| Solids | | As (%) | Fe (%) | | |
| | 48 | 19.0 | 15.3 | | 1.08 |
| Washing | | As (mg/L) | Fe (mg/L) | | |
| Sco-A, 1stWash | | 45.3 | 15.7 | | 0.46 |
| Sco-A, 2ndWash | | 2.9 | 1.8 | | 0.83 |
| Sco-A, 3rdWash | | 0.5 | <=0.1 | | |

The mass yield (grams scorodite/L) was 53.1, the scorodite purity (based on As) was 58.5%, the scorodite yield based on As in solution was 96.2%, and the scorodite yield based on Fe in solution was 99.0%. The remainder of the material produced was primarily gypsum. A scorodite sample was taken and subjected to a simulated Toxicity characteristic leaching procedure ("TCLP"). Simulated TCLP gave the following results set forth in Table 6:

TABLE 6

TCLP Test

| As Assays (mg/L) | TCLP | TCLP Day 2 | TCLP Day 3 | |
|---|---|---|---|---|
| Sco1 | 0.7 | 0.6 | 0.5 | Using outlet from arsenic oxidation test using AF5 and ferric sulfate |

TCLP limit 5 mg/L

As can be seen from Table 6, the scorodite generated is below the TCLP limit of 5 mg/L in the leachate.

A number of variations and modifications of the disclosure can be used. It would be possible to provide for some features of the disclosure without providing others.

For example in one alternative embodiment, the above processes can be applied for oxidation and precipitation of antimony species. Stated differently, the above processes as described would work for a trivalent antimony-containing solution stream (instead of a trivalent arsenic-containing solution stream) to remove trivalent antimony through oxidation to pentavalent antimony.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
receiving a trivalent arsenic-containing solution stream;
contacting the received trivalent arsenic-containing solution stream with a carbon additive and oxygen at an acidic pH to oxidize, at ambient pressure, most, or all, of the arsenic from the trivalent state to a pentavalent state, wherein the carbon additive acts as an arsenic collection surface, wherein the trivalent arsenic-containing solution stream has in the contacting step an oxidation-reduction potential of about 350 mV or more;
desorbing the arsenic in the pentavalent state from the carbon additive to form a barren carbon additive and an oxidized arsenic-containing solution stream;
thereafter precipitating the pentavalent arsenic in the oxidized arsenic-containing solution stream to form a precipitate and an arsenic depleted liquid phase; and
separating the precipitate from the arsenic depleted liquid phase.

2. The method of claim 1, wherein the contacting step further comprises:
passing the trivalent arsenic-containing solution stream through a column comprising a fixed or fluidized bed of a carbon additive, at atmospheric pressure and a temperature of about 95 degrees Celsius or less, wherein a mass of carbon in the column is greater than a mass of arsenic in the column, wherein the column comprises greater than 100 g/L of the carbon additive, wherein the trivalent arsenic-containing solution stream has a higher concentration of arsenic in the trivalent oxidation state than arsenic in the pentavalent oxidation state, wherein the trivalent arsenic-containing solution stream contains ferric ions, wherein the acidic pH of the trivalent arsenic-containing solution stream in the contacting step is about pH 2.5 or less, wherein the received arsenic-containing solution stream comprises a valuable metal, wherein the valuable metal is recovered in a step separate from the thereafter precipitating and separating steps, and wherein the precipitate is scorodite.

3. The method of claim 1, wherein the precipitate is scorodite, wherein the received trivalent arsenic-containing solution stream comprises ferrous iron, wherein the ferrous iron is oxidized in the contacting step to ferric iron, and wherein the received trivalent arsenic-containing solution stream has a dissolved solids content of less than about 5 wt. %.

4. The method of claim 1, wherein the carbon additive is activated carbon, wherein the trivalent arsenic-containing solution stream has a higher concentration of arsenic in the trivalent oxidation state than arsenic in the pentavalent oxidation state, wherein, under the reaction conditions of the contacting step, at least most of the trivalent arsenic is converted into pentavalent arsenic, wherein, in the desorbing step, at least most of the pentavalent arsenic-loaded carbon additive is desorbed from the carbon additive, and wherein the arsenic depleted liquid phase contains less total arsenic than the received trivalent arsenic-containing solution stream.

5. The method of claim 1, wherein the contacting step is performed at ambient pressure and temperature, wherein, during the contacting step, a column comprises from about 100 to about 300 g/L of carbon additive, wherein the received trivalent arsenic-containing solution stream is free of hydrogen peroxide and ozone in the contacting step, and wherein the arsenic depleted liquid phase comprises about 2 g/L total dissolved arsenic or less.

6. The method of claim 1, wherein the trivalent arsenic-containing solution stream contains negligible solids, wherein the desorbing step comprises the sub-step of separating the carbon additive from the oxidized arsenic-containing solution stream and wherein the separating sub-step comprises removing the oxidized arsenic-containing solution stream from a bed of the carbon additive.

7. The method of claim 6, wherein, at the reaction conditions of the contacting step, at least most of the trivalent arsenic is converted into pentavalent arsenic, wherein ferrous and/or ferric iron is present during the contacting step, wherein at least most of the pentavalent arsenic precipitates as scorodite and does not adsorb onto the carbon additive, and wherein, in the separating sub-step, at least most of the scorodite is separated from the arsenic depleted liquid phase, the arsenic depleted liquid phase containing less total arsenic than the received trivalent arsenic-containing solution stream.

8. The method of claim 1, wherein the trivalent arsenic-containing solution stream is derived from a hydrometallurgical leaching process.

9. A method, comprising:
receiving a trivalent arsenic-containing solution stream;
contacting the received trivalent arsenic-containing solution stream with a carbon additive and oxygen at an acidic pH and atmospheric pressure and a temperature of about 95 degrees Celsius or less to oxidize, most, or all, of the arsenic from the trivalent state to a pentavalent state, wherein the carbon additive acts as an arsenic collection surface;
desorbing the arsenic in the pentavalent state from the carbon additive to form a barren carbon additive and a pentavalent arsenic-containing solution stream;
thereafter contacting the pentavalent arsenic-containing solution stream with a ferric ion-containing solution to precipitate the pentavalent arsenic as scorodite and form an arsenic depleted liquid phase; and
separating the scorodite from the arsenic depleted liquid phase.

10. The method of claim 9, contacting step further comprises:
passing the trivalent arsenic-containing solution stream though a column comprising a fixed or fluidized bed of a carbon additive, at an oxidation reduction potential of greater than about 350 mV, wherein a mass of carbon in the column is greater than a mass of arsenic in the column, wherein the column comprises greater than 100 g/L of the carbon additive, wherein the ferric ion-containing solution is derived from acid leaching of an iron-containing material, and wherein the step of desorbing the arsenic in the pentavalent state from the carbon additive comprises removing the pentavalent arsenic from the a fixed or fluidized bed of the carbon additive.

11. The method of claim 9, further comprising:
washing the carbon additive to remove at least part of any arsenic and/or metals collected on a surface of the carbon additive.

12. The method of claim 10, wherein the carbon additive remains in the fixed or fluidized bed of the carbon additive while the pentavalent arsenic-containing solution stream is removed from the fixed or fluidized bed of the carbon additive.

13. The method of claim 9, wherein the received trivalent arsenic-containing solution stream is derived from a hydrometallurgical leaching process.

14. A method, comprising:
receiving a trivalent arsenic- and/or antimony-containing solution stream;
contacting the trivalent arsenic- and/or antimony-containing solution stream with a carbon additive and oxygen while passing the received trivalent arsenic- and/or antimony-containing solution stream though a column comprising a fixed or fluidized bed of the carbon additive at an acidic pH and atmospheric pressure and a temperature of about 95 degrees Celsius or less to oxidize at least most of the trivalent arsenic and/or antimony to the pentavalent state to form pentavalent arsenic- and/or antimony-loaded carbon additive, and a treated stream having a lower total arsenic and/or antimony concentration than the trivalent arsenic- and/or antimony-containing solution stream, wherein the carbon additive acts as an arsenic collection surface, and wherein a mass of carbon additive in the column is greater than a mass of arsenic in the column;
desorbing the arsenic and/or antimony in the pentavalent state from the pentavalent arsenic- and/or antimony-loaded carbon additive to form a barren carbon additive to form a depleted carbon additive and a pentavalent arsenic- and/or antimony-loaded wash stream;
thereafter precipitating the pentavalent arsenic and/or antimony from the pentavalent arsenic- and/or antimony-loaded wash stream to form a precipitate and an arsenic- and antimony-depleted liquid phase; and
separating the precipitate from the arsenic- and antimony-depleted liquid phase.

15. The method of claim 14, wherein the pentavalent arsenic and/or antimony-loaded wash stream comprises ferric iron, wherein the column comprises greater than 100 g/L of the carbon additive, wherein the acidic pH of the trivalent arsenic-containing solution stream in the contacting step is about pH 2.5 or less, wherein the trivalent arsenic- and/or antimony-containing solution stream, in the contacting step, has an oxidation-reduction potential of about 350 mV or more, wherein the received trivalent arsenic- and/or antimony-containing solution stream comprises a valuable metal, wherein the valuable metal is recovered in a step separate from the thereafter precipitating and separating steps, and wherein the precipitate comprises scorodite and/or pentavalent antimony.

16. The method of claim 14, wherein, at the reaction conditions of the contacting step, at least most of the trivalent arsenic and/or antimony is converted into pentavalent arsenic and/or antimony, wherein the reaction conditions of the contacting step comprise ambient pressure and temperature, wherein, during the contacting step, the column comprises from about 100 to about 300 g/L of carbon additive, wherein the received trivalent arsenic- and/or antimony-containing solution stream is free of hydrogen peroxide and ozone in the contacting step, wherein at least most of the pentavalent arsenic and/or antimony adsorbs onto the carbon additive, wherein the treated stream contains less total arsenic and/or antimony than the received trivalent arsenic- and/or antimony-containing solution stream, and wherein the depleted liquid phase comprises no more than about 2 g/L total dissolved arsenic.

17. The method of claim 15, wherein the trivalent arsenic- and/or antimony-containing solution stream comprises arsenic and wherein the precipitating step further comprises:
contacting the pentavalent arsenic- and/or antimony-loaded wash solution with ferric ion, wherein at least most of the pentavalent arsenic and pentavalent antimony precipitates, and wherein at least most of pentavalent arsenic precipitates as scorodite.

18. The method of claim 14, wherein the step of separating the pentavalent arsenic- and/or antimony-loaded carbon additive from the treated stream comprises removing the treated stream from the fixed or fluidized bed of the pentavalent arsenic- and/or antimony-loaded carbon additive.

19. A method, comprising:
receiving a trivalent arsenic-containing solution stream, the received trivalent arsenic-containing solution stream having a higher concentration of trivalent arsenic than pentavalent arsenic;
contacting the received trivalent arsenic-containing solution stream with a carbon additive, ferric ion, and oxygen at an acidic pH and atmospheric pressure and a temperature of about 95 degrees Celsius or less to oxidize at least most of the trivalent arsenic to pentavalent arsenic and form a slurry comprising scorodite precipitates and carbon additive, wherein the received trivalent arsenic-containing solution stream is free of hydrogen peroxide and ozone during the contacting step; and
separating the carbon additive from the scorodite precipitates to form a liquid component of the slurry and a depleted carbon additive for recycle to the contacting step as at least part of the carbon additive of the contacting step; and
separating scorodite precipitates from the liquid component of the slurry, thereby forming a treated stream and an arsenic-containing residue comprising the scorodite precipitates.

20. The method of claim 19, wherein the received trivalent arsenic-containing solution stream contains negligible solids, wherein the acidic pH of the received trivalent arsenic-containing solution stream in the contacting step is about pH 2.5 or less, wherein the received trivalent arsenic-containing solution stream, during the contacting step, has an oxidation-reduction potential of about 350 mV or more, wherein the received trivalent arsenic-containing solution stream comprises a valuable metal, and wherein the valuable metal is recovered in a step separate from the contacting and separating steps.

21. The method of claim 20, wherein, at the reaction conditions of the contacting step, at least most of the pentavalent arsenic precipitates as scorodite and does not adsorb onto the carbon additive, wherein the received trivalent arsenic-containing solution stream comprises ferrous iron, wherein the ferrous iron is oxidized to ferric iron in the contacting step, wherein the received trivalent arsenic-containing solution stream has a dissolved solids content of about 5 wt. % or less, and wherein the treated stream contains less total arsenic than the received trivalent arsenic-containing solution stream.

22. The method of claim 19, wherein the contacting step is performed at ambient pressure and temperature, wherein the received trivalent arsenic-containing solution stream is free of hydrogen peroxide and ozone in the contacting step, wherein the arsenic depleted liquid phase comprises no more than about 2 g/L total dissolved arsenic, wherein, during the contacting step, the concentration of carbon additive is from about 100 to about 300 g/L.

23. The method of claim 19, wherein the separated carbon additive is washed with an acidic wash solution to remove any pentavalent arsenic therefrom and wherein the washed separated carbon additive is recycled to the contacting step.

24. The method of claim 19, wherein the received trivalent arsenic-containing solution stream is derived from a hydrometallurgical leaching process.

* * * * *